United States Patent [19]

Ferris, Jr.

[11] 3,931,473
[45] Jan. 6, 1976

[54] DIGITAL MULTIPLEXER SYSTEM
[75] Inventor: Walton C. Ferris, Jr., Palo Alto, Calif.
[73] Assignee: TRW Inc., Los Angeles, Calif.
[22] Filed: Sept. 3, 1974
[21] Appl. No.: 502,293

[52] U.S. Cl. .......................... 179/15 AF; 179/15 BS
[51] Int. Cl.² .......................................... H04J 3/06
[58] Field of Search........... 179/15 AF, 15 BS, 15 A

[56] References Cited
OTHER PUBLICATIONS
*Note Recensioni E Notizie;* Vol. XIX, No. 5, pp. 629–649; "Second Order Multiplexing of PCM Telephone Systems," by Brugia et al., Oct. 1970.
*Electronics & Communications in Japan;* Vol. 52A, No. 6, 1969; "On Multiplexing Systems for PCM Hierarchical Networks," by Kuroyanagi et al.

*Primary Examiner*—Douglas W. Olms
*Attorney, Agent, or Firm*—Flehr, Hohbach, Test, Albritton & Herbert

[57] ABSTRACT

A second level multiplexer for a PCM data system provides for fast reframing by utilizing the stuff words in the frame organization in addition to the main framing word. This provides a clear indication of a misframe condition. In addition, integration of errors by a counter supplies immunity to medium amounts of noise. The foregoing provides for an optimum environment for frame synchronized scrambling and descrambling to be accomplished.

4 Claims, 8 Drawing Figures

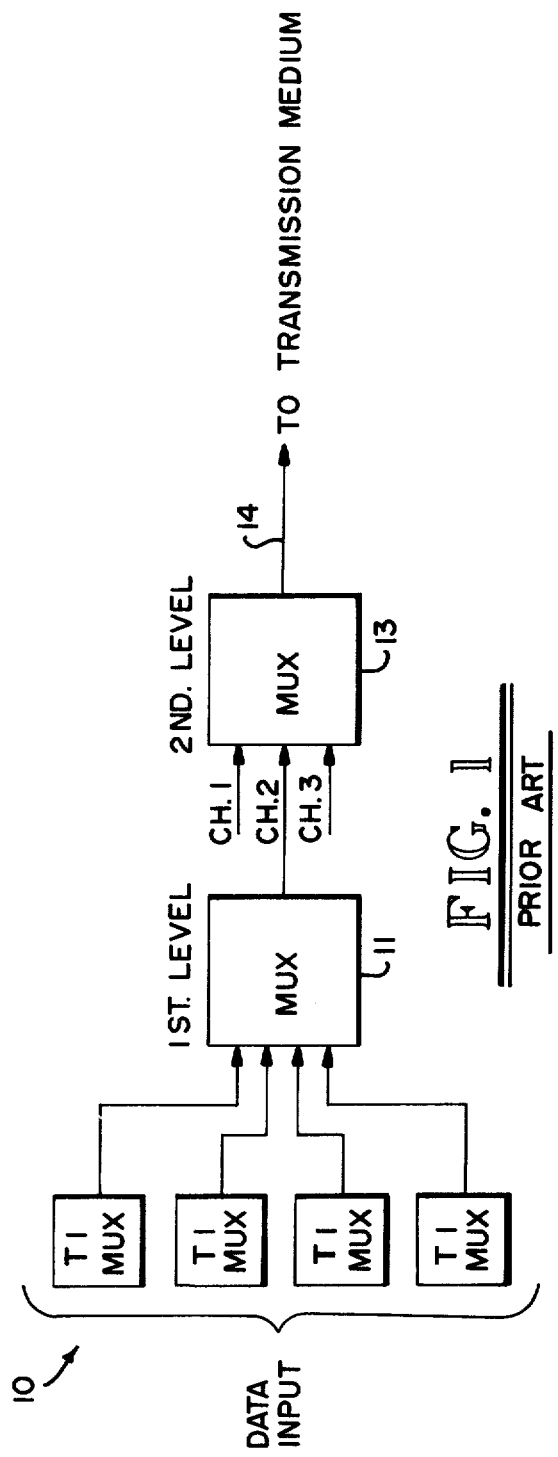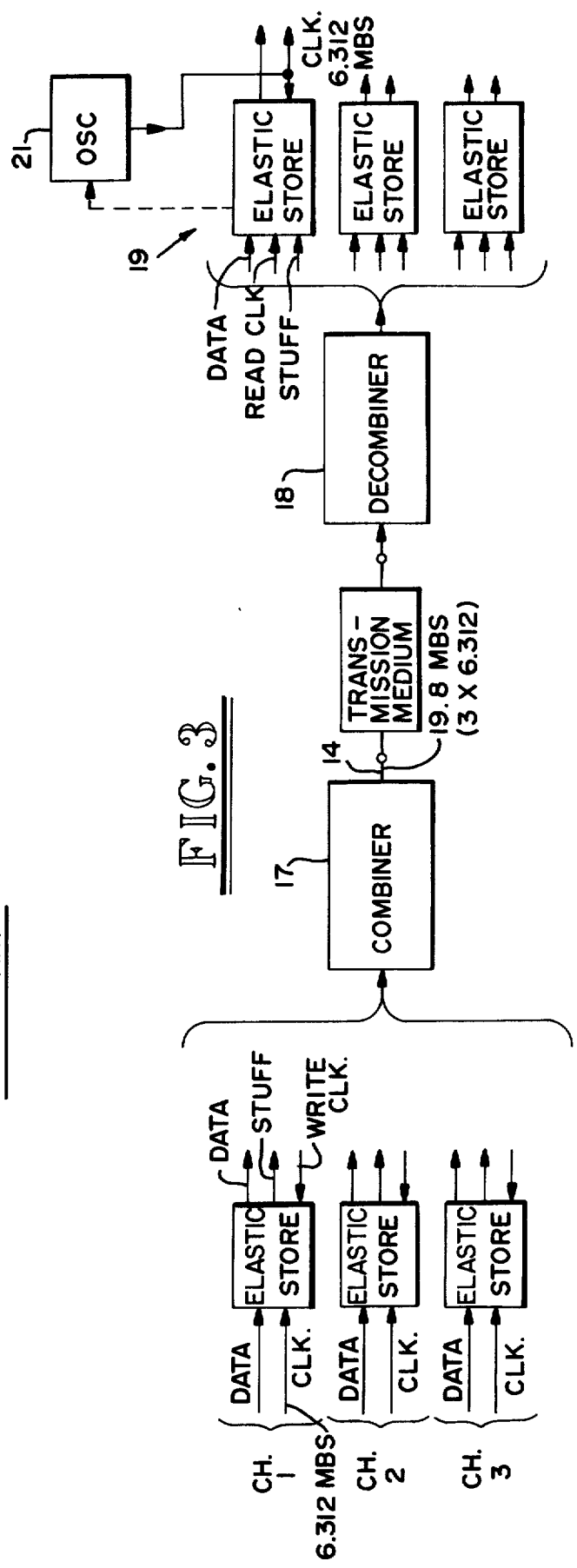

3,931,473

DIGITAL MULTIPLEXER SYSTEM

BACKGROUND OF THE INVENTION

The present invention is directed to a digital multiplexer system and more specifically, to a system for multiplexing a plurality of PCM data channels into a serial bit stream for transmission to a demultiplexing receiver. The foregoing system in more specific terms is utilized in a microwave transmission system in a second level multiplexer terminal.

In addition, the present invention is directed to a transmission system of the above type in which the digital data scrambler is provided which as is well known in the art eliminates high frequency periodic sequences or creates a more even distribution of power throughout the baseband.

Thus far two types of scramblers have been used; nonsynchronizing and self-synchronizing. Both of these techniques suffer from either loss of channel capacity or excessive errors when a long sequence scrambler is used for sufficient scrambling.

In addition, in a digital data system of the present type which because of its second level nature inherently carries a large amount of information, specifically 19.8 megabits per second, it is important that each frame be maintained in synchronization as continuously as possible. In other words, the framing should be relatively secure even with noise. In addition if loss of frame synchronization occurs, there should be provided relatively fast reframing since the time out-of-frame synchronization is in essence loss of channel capacity.

At the present time, framing is usually accomplished by seeking a simple match with the framing word at the beginning of each frame or with a framing bit. This has been found to be inadequate for high capacity systems.

Systems which provide one long framing word per frame interrupt the data at a certain rate which causes jitter in the demultiplexed data or the reconstituted clock train; the lower the rate the more difficult it is to filter out.

OBJECTS AND SUMMARY OF THE INVENTION

Accordingly, it is an object of the present invention to provide a digital multiplex system which has improved reframing, secure framing while in synchronization despite noise, and provides in conjunction with the foregoing improved scrambling.

It is another object of the invention to provide a system as above with low jitter.

In accordance with the above objects there is provided a digital multiplexer system for multiplexing a plurality of PCM data channels into a serial bit steam which is divided into frames by a frame counter means. Each frame is indicated by a frame word for transmission to a demultiplexing receiver which also includes frame counter means. Such systems insert a plurality of redundant stuff words in the bit stream to indicate whether or not they have substituted for data at least one stuff bit to accommodate timing irregularities. In accordance with the invention means are provided for sensing the redundant stuff words and for providing an error signal if the stuff words are not redundant because of an error during the transmission. Means sense the framing word. Counting means count the errors and provide a misframe signal. Coincidence means sense a frame match and a misframe signal for resetting the frame counter means of the receiver.

BRIEF DESCRIPTION OF THE DRAWINGS

FIg. 1 is a block diagram of a typical application of a second level multiplexer system as known in the prior art;

FIG. 3 is a detailed block diagram of the second level multiplexer of FIG. 1;

DETAILED DESCRIPTION OF THE PREFERRED EMBODIMENT

The present invention is in the embodiment of a second level multiplexer in a pulse code modulation (PCM) microwave transmission system. The blocks in FIG. 1 labeled T1 Multiplexer 10 actually are D1, D2 or D3 terminals which are standard in the PCM art and in the telephone industry. They would have several data channels being fed into them.

A first level multiplexer 11 multiplexes four channels in the present case as shown and produces an output on line 12 at a bit rate of 6.312 megabits per second. A second level multiplexer 13 receives several of the first level channels at this bit rate multiplexing them to provide a serial bit stream on line 14 which has a frequency of N, the number of channels, multiplexed by the bit rate on line 12. That is, it would have such a bit rate were it not for the combination of frequency tolerances in the multiplexing system which is accommodated by the use of stuffing; the actual rate on line 14 is about 350 parts per million higher than that.

Figure 2A:
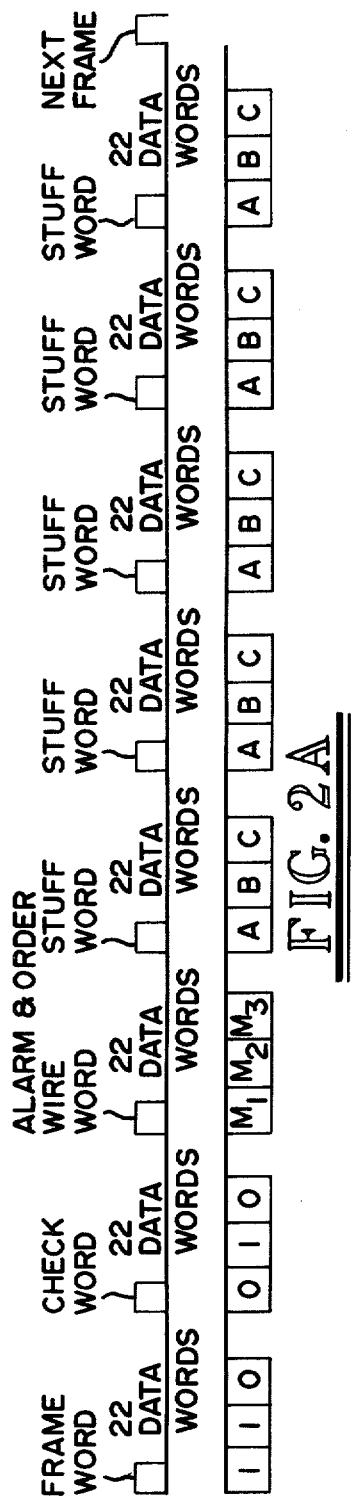
FIG. 2A is a timing diagram showing a typical main frame used in the present invention.

Specifically, in every frame of the serial bit stream on line 14 as illustrated in FIG. 2 there is a frame word which identifies the start of the frame and a number of stuff words which indicate to the receiver whether or not a bit has been stuffed. As illustrated, the stuff bit is substituted in the twelfth word of the last frame portion to accommodate such timing irregularity. In the main frame illustrated in FIG. 2A, there are 176 data words and eight overhead words including the frame, check, alarm and order and the five stuff words. The specific frame word of the preferred embodiment has three bits which corresponds to the number of channels being multiplexed. However, many more channels could be accommodated by increasing the length of all the words.

As discussed above in conjunction with FIG. 1, because of the use of stuff words in addition to the frame word and check words, the actual frequency of the serial bit stream from the transmitter elastic store, to the receiver elastic store must be greater by 4.5% than the 6.312 megabits per second of each of the individual channels being inputed into the multiplexer 13 of FIG. 1. The 4.5% is derived from 8 divided by 176. Thus the serial bit stream from the transmitter elastic store to the receiver elastic store is approximately 616 megabits per second. Each data word and stuff word contains a bit derived from their respective channels indicated A, B and C. The specific construction of the main frame is discussed in the table below.

| Frame Word | N bits long; the same every frame. The scrambled frame code always stands 110 (0010). |
| --- | --- |
| Check Word | N bits long; it alternates every frame. Bits 1–3 are used as a check on frame. Other bits are spares. |
| Alarm & Order-wire Word | N bits long. B 1 is alarm, bits 2 and 3 are reserved for order-wire use (can be multiplexed into one 71.6 Kg/s line). Other bits are spares. |
| Stuff Words (s) | Each is N bits long. Bit 1 is for Channel 1; bit 2 is for Channel 2, etc. This provides five redundant bits for each stuff signal. The bits are widely separated in time. |
| Data Words (176) | Each is N bits long. Bit 1 is for Channel 1; bit 2 for Channel 2, etc. |
| Scrambling | An eleven-cell pseudo-random word generator is reset to a particular word at the start of each frame. It creates the frame word and is used to scramble all the other words. The scrambling word does not repeat any sequence during a frame, but does repeat itself every frame. An error in transmission does not cause the descrambling process to produce any additional string of errors. |
| Word Length | 151 ns (6.61 MHz) |
| Frame Length | 27.9 µs (35.8 KHz) |

The second level multiplexer 13 of FIG. 1 is shown in greater detail in FIG. 3 along with the receive part of the system. Each of the channels, 1, 2 and 3 is coupled into elastic stores 16 along with the 6.312 megabit per second clock signal and written out a rate of 6.60 megabits per second (assuming no interruptions) in a manner well known in the art with the overhead word such as the stuff, frame, check and alarm words being added.

Figure 2B:
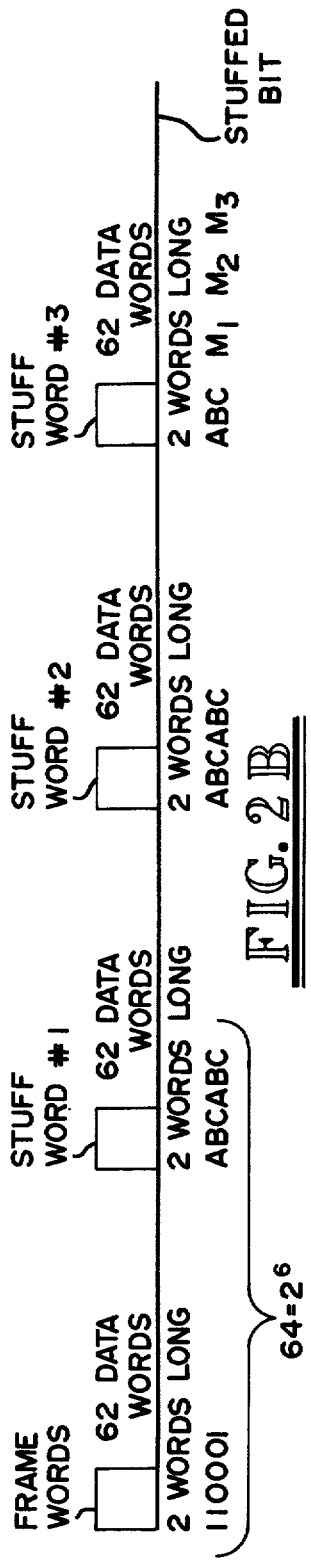
FIG. 2B is an alternative to FIG. 2A.

The alternative embodiment of FIG. 2B uses a longer frame word which contains enough information to be descrambled by itself. Also two of the stuff words have redundant bits. Thus faster reframing is possible. They are all combined in a serial bit stream combiner 17 to be coupled to the transmission medium on serial bit stream line 14. The receiver portion of the system includes the decombiner 18, the elastic stores 19 which includes the oscillators 21 to provide the clocking for the data output. The bit stream speed on line 14 is thus 6.312 times N, the number of channels or 19.8 MBS. However, since both the write and read clocks are interrupted every 23rd time, the average rate is still 6.312 MBS. The elastic stores 16 and 19 are well known in the art.

Figure 4:
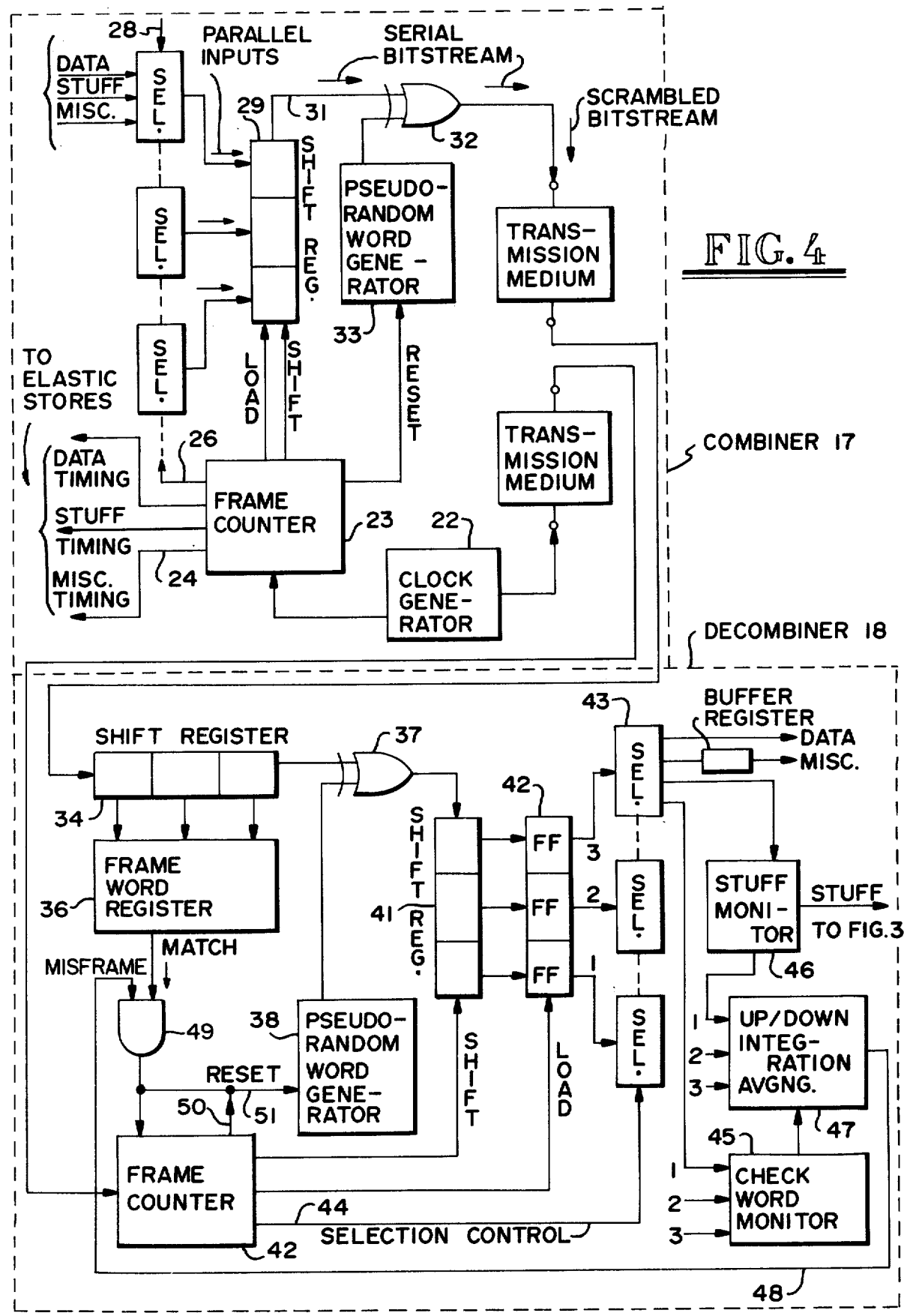
FIg. 4 is a block diagram of combiner and decombiner portions of FIG. 2A.

FIG. 4 illustrates in greater detail the combiners 17 and 19 of FIG. 3 and illustrate more clearly the operation of the process. A clock generator 22 in general operates at the bit stream speed of N times 6.6 megabits per second and in addition provides clocking to the remaining blocks of the system such as the frame counters 23. Frame counters 23 divide down the clock generator input and provide data timing, stuff timing and miscellaneous timing on the lines 24 to the elastic store units 16 of FIG. 3. Counter 23 also provides on line 26 selection control inputs to the selector switcher 27. There is one selector block for each channel. They have as inputs data, stuff miscellaneous and frame information. The selecting switch in effect looks at data for the one bit alloted to that channel, which is, of course, a portion of the three bit data word. In the same manner, the stuffing instruction and miscellaneous data are selected. In addition, input 28 provides both the frame and the check word. All of the foregoing selection and generation of the stuff bits is well known and not shown in detail.

The same type of bits, such as data of all three channels is synchronously selected and parallel inputs are coupled to the shift register 29. That is, when data is selected all channels are told at the same data timing time to send a new data bit. These are presented in parallel to the shift register. This occurs over a timing interval of 151 nanoseconds which is approxiamtely 6.6 megahertz. The frame counter 23 instructs the shift register to load in parallel and through a shift register 29 and shifts out the three bits to the serial bit stream line 31 at the rate of N times 6.6 megabits per second. This line is combined in an exclusive OR gate 32 with the output of pseudo-random word generator 33 which is reset from a reset input from the frame counter 23.

After transmission the scrambled bit stream is unscrambled and demultiplexed by the decombiner 18. The scrambled bits are coupled to the receive portion of the system to the shift register 34 which again converts three bits of the second bit stream to parallel format and couples the word to the frame word recognizer 36 to provide for later reframing as will be discussed in detail. The serial output of shift register 34 is coupled to an exclusive OR gate 37 which is also driven by a pseudo-random word generator 38 to provide an unscrambled serial bit stream line 39 to a shift register 41. This shift register is driven or shifted by receive frame counters 42. The second bit stream on line 49 in the shift register 41 therefore has been converted back into a parallel format and is coupled through the flip-flop 42 to the selector switches 43. Thereafter, the frame counters 42 by means of its selection control output 44 to selector switches 43 direct where the different bits are to be placed. That is, the data information is coupled to the data output line as indicated, frame or check word information to a monitor 45, stuff information is coupled to the monitor unit 46 and miscellaneous data to the proper output.

If a stuffing instruction is received, stuff monitor 46 senses the stuff instruction and instructs the elastic store unit by means of the stuff input as illustrated in FIG. 3 of elastic store unit 19 to ignore that data bit.

All of the foregoing as regards stuffing, is well known in the art.

A unit 47 senses both the stuff words and the check words and integrates or averages the errors. As discussed above, the stuff information is essentially redundant being a string, in a single channel, of five zeros or five ones. Thus, the stuff information is redundant.

In general, the up/down integration/averaging unit 47, if there are no errors counts down to a minimum value and holds. When errors are received, it counts up and when it reaches a predetermined maximum it declares a misframe on the output line 48 which is coupled to AND gate 49. The other coincidence input of the AND gate is the match output from the frame word recognizer 36. When a misframe is declared, another match is looked for by the frame word recognizer 36 and when a match is found a match output occurs to AND gate 49 and a reset occurs. The reset output is also coupled on line 51 in addition to frame counter 42 to the pseudo-random word generator 38. A reset also occurs in normal operation for every frame on line 50 from frame counter 42 and thus, in accordance with the invention the random word generator is reset for every frame. Since the frame pulse pattern is always the same, it is therefore, not scrambled so that reframing can be accomplished without regard for the other bits. Thus, the shift register 34 is located before psuedo-random word descrambler OR gate 37.

As will also be discussed below, in the preferred embodiment, if a misframe is declared, the up/down counter 47 when a frame condition is again found is only one count from its maximum. Thus, if in checking the stuff words an error is found to occur, a misframe is again declared. Thus, in accordance with the invention the use of the stuff words to declare a misframe produces faster reframing since only one frame has to pass before the system realizes it is out of frame. Parenthetically, of course, since the frame work is only three bits, if N=3, there is one chance out of eight that a pattern corresponding to the frame word will be accidentally recognized while passing through data trying to find a frame.

On the other hand, the system is inherently secure in its framing even with medium noise. If a synchronized framing situation is present for a long period of time, the up/down counter 47 is counted down to a minimum level. This counting down occurs from both looking at the check word match and the stuff word match. In other words, the system is being averaged downward. If some noise appears in the system as, for example, a stuff error is indicated, a small count up occurs and no misframe is declared. Thereafter, if the system operates properly, a count down to the minimum will occur. Thus, by the use of the up/down averaging circuit fast reframes are provided by means of sensing stuff words in addition to framing words and not locking in on the wrong frame word or an accidentally produced frame word and on the other hand there is a high immunity to noise to provide for secure framing by reason of the necessity of counting up a predetermined number of errors.

Figure 5:
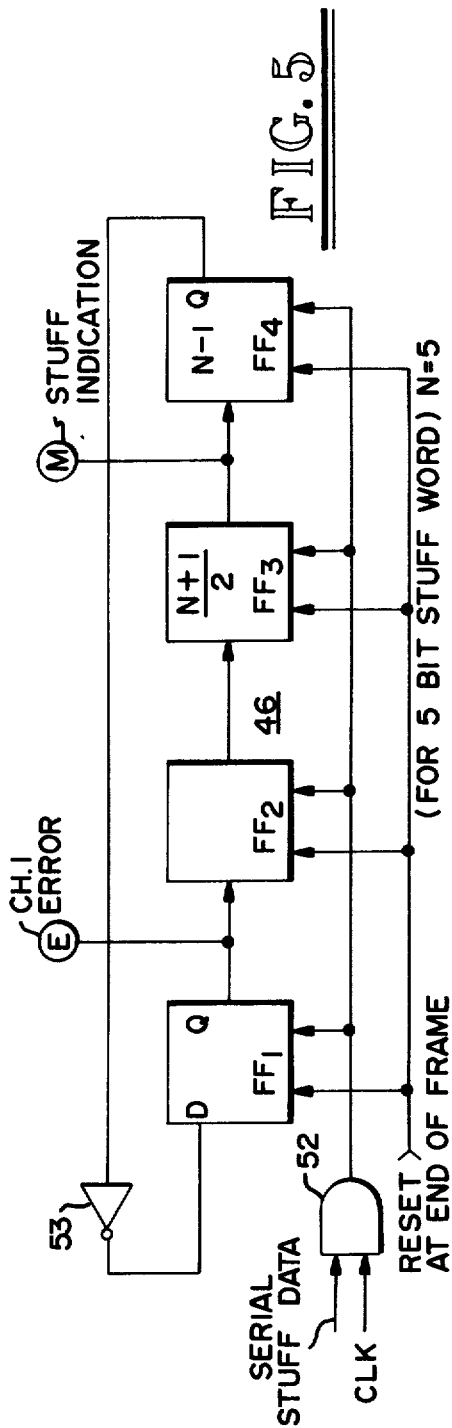
FIG. 5 is a detailed block diagram of a portion of the monitor block of FIG. 4.

FIG. 5 illustrates the stuff pulse monitor 46 which performs the dual function of indicating an error in stuff data, the output E, and also indicates whether a string of all zeros or all ones indicating no stuffing or stuffing respectively has occurred, at the output M. This is in essence a majority voting indication indicating that there are more ones than zeros or more zeros than ones. There is one circuit of FIG. 5 for each channel and in the preferred embodiment the circuit receiver a five bit stuff word since one channel has reserved for it one bit of each of the five stuff words present in the frame organization of the present invention. Four flip-flops FF1 through 4 are provided with the error, E, indication being the Q output of the first flip-flop and the stuff indication, M, being the Q output of the $(n+1)/2$ flip-flops, n being the number of bits in the stuff word. Serial stuff data from the channel is inputed along with the clock input $t$ AND gate 52. Four flip-flops are in a cascaded arrangement with the Q output of the last flip-flop being fed back to the output of the first flip-flop through an inverter 53.

In operation all flip-flops are reset, for example to zero. If five zeros are present in channel 1, none of the clock pulses are allowed through gate 52. All the flip-flops remain zero. Thus, the E output is a zero and the M output is zero. There are no errors and the stuff indication is no stuffing has occurred. The Q output of the last flip-flop, FF4, is inverted and thus, in this condition the input to flip-flop is a logic one.

If one of the five bits from channel 1 was a 1, one clock pulse would be produced. The input to FF1 would be a one to produce a one on its Q output to indicate an error. Thus, a one has been shifted through one flip-flop. If there are three ones, the stuff indication M will be one. Five ones which is a no error condition will clock ones through all four flip-flops and then one more time so that the output of the last flip-flop is clocked into flip-flip one to cause its Q output to go low indicating no error. The majority voting output is still in the middle of the one output and will still maintain its proper indication. The foregoing system is suitable for any odd number of inputs.

Figure 6:
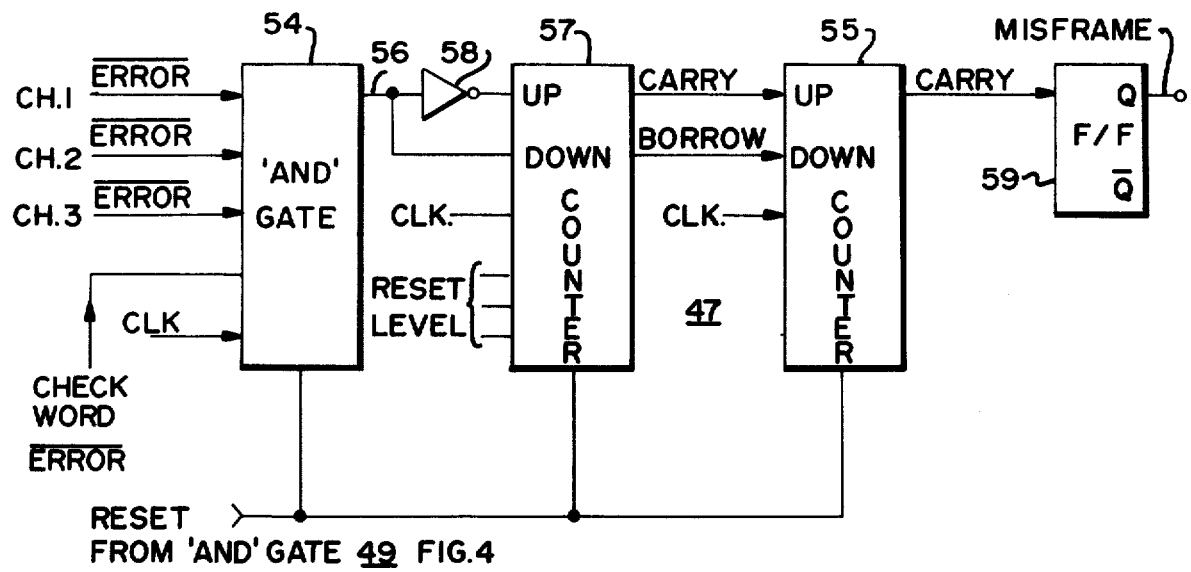
FIG. 6 is a detailed block diagram of the up/down integration/averaging block of FIG. 4.

The up/down integration/averaging unit 47 is shown in greater detail in FIG. 6 and includes an inputs channel 1 error, channel 2 error and channel 3 error all which are coupled from three monitor circuits as illustrated in FIG. 5. In addition, the check word is inputed into the AND gate unit 54. The check word is patterned so that when descrambled it will alternate from frame to frame with three bits of zeros and three bits of one. There is a circuit in block 45 (FIG. 4) that checks that all of the check bits agree and that the alternation from frame to frame is maintained. This is coupled into the averaging unit of FIG. 6 as a backup error indication. The inputs which all normally indicate a lack of errors produce on the line 56 a down count indication to counter 57. Thus "not" error produces a down count to a minimum level determined by the minimum level strapping of the counter. If an error does occur, the output 56 will go low causing a high output through the inverter 58 to the up input terminal of the counter which counts up. In order to provide a counter with greater capability, the counter 58 is coupled to the carry and borrow outputs of counter 57 and respectively to its up and down inputs, this provides a longer counter since each counter 57 and 58 which is integrated circuit counts by 16 and must have 16 up pulses to make it overflow or carry. Sixteen down pulses are for borrow purposes. Thus, the integration is increased to 16 times 16 or 256. If counter 58 overflows, its carry output drives the flip-flop 50 to produce a misframe indication. This misframe output remains until being reset by the output from AND gate 49 from FIG. 4. In addition, the counters are reset. The reset level is determined by the reset strapping. As discussed above, this would be either one count or five counts from where the counter 58 produces the carry output. Thereafter, if no errors occur, the counters will count down to their minimum.

In operation if the system is in frame and has been counted down to zero, a continuous stream of noise is required to declare a misframe. In general, by definition with a continuous stream of noise, the amount of errors received is technically 50%. If the error monitor is sensing five stuff bits which must agree there is 30 out of 32 chances that an error will be indicated. Thus, the errors will quickly count up. Since the check word errors are included there are approximately 15 error pulses per frame. Thus, an error occurs after every stuff word or check word. Thus, approximately 16 frames must be counted before a misframe is declared.

Figure 7:
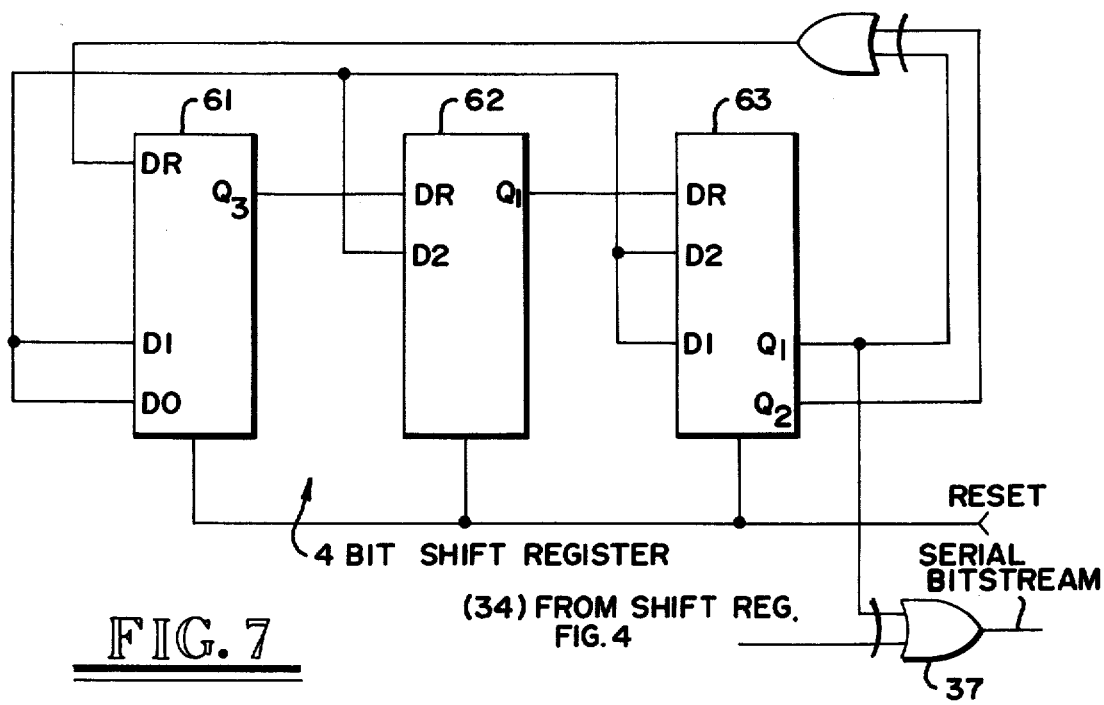
FIG. 7 is a detailed block diagram of the pseudo-random word generator block of FIG. 4.

FIG. 7 indicates a typical pseudo-random word generator which has three four bit shift registers 61, 62 and 63. Specifically, the word generators 38 is illustrated from the decombiner 18. The particular integrated circuit of the shift registers provides that if there is no input connection that input is zero. In accordance with well known techniques the various outputs and inputs of the shift registers are connected in a predetermined pattern which is matched with that of the transmit pattern. The pattern determines the peculiar rule by which the bits are circulated in the four stage shift register and repeats itself every 2047 clocks. However, a reset pulse normally occurs at every 552 clocks so the pattern does not repeat itself.

Thus, the present invention has provided an improved second level multiplexer for a digital transmission system which has improved reframing both from a speed standpoint and for security of framing against noise. In addition, improved scrambling is accomplished by the use of frame synchronization. Scrambling is also improved in that as long as a sequence as desired may be used and yet one bit in error due to the transmission will cause only one data error.

Low frequency jitter is minimized due to the equal lengths of the overhead or stuff words.

I claim:

1. A digital multiplexer system for multiplexing a plurality of digital data channels into a serial bit stream, which is divided into frames by a frame counter means, each frame being indicated by a frame pattern for transmission to a demultiplexing receiver which also includes a frame counter means such system using a plurality of stuff words having redundant bits in said bit stream to indicate whether or not to substitute at least one stuff bit to accommodate timing irregularities, said system comprising; means for sensing said stuff words and for providing an error signal if said bits of said stuff words are not redundant because of an error during said transmission, means for sensing said frame pattern, counting means for counting said errors and providing a misframe signal, coincidence means responsive to said means for sensing said frame pattern for sensing a misframe signal for resetting said frame counter means of said receiver.

2. A system as in claim 1 which includes pseudo-random word generators in the transmission and receiver portions of the system for respectively scrambling and descrambling said serial bit stream the word generator in said receiver portion being reset by said coincidence means.

3. A system as in claim 1 where said counting means provides said misframe signal after a predetermined plurality of errors have been counted.

4. A system as in claim 3 where said counting means are initially reset to provide a misframe signal after only relatively few errors are received.

* * * * *